United States Patent
Eguchi (10) Patent No.: US 11,260,884 B2
(45) Date of Patent: Mar. 1, 2022

(54) VEHICLE CONTROL APPARATUS, VEHICLE, OPERATION METHOD OF VEHICLE CONTROL APPARATUS, AND NON-TRANSITORY COMPUTER-READABLE STORAGE MEDIUM

(71) Applicant: HONDA MOTOR CO., LTD., Tokyo (JP)

(72) Inventor: Atsuhiro Eguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/890,267

(22) Filed: Jun. 2, 2020

(65) Prior Publication Data
US 2020/0385022 A1    Dec. 10, 2020

(30) Foreign Application Priority Data

Jun. 6, 2019  (JP) .............................. JP2019-106478
May 27, 2020 (JP) .............................. JP2020-092512

(51) Int. Cl.
*B60W 30/18* (2012.01)
*B60W 60/00* (2020.01)

(52) U.S. Cl.
CPC .. *B60W 60/0025* (2020.02); *B60W 30/18163* (2013.01); *B60W 2552/53* (2020.02); *B60W 2554/402* (2020.02)

(58) Field of Classification Search
CPC ....... B60W 60/0025; B60W 30/18163; B60W 2554/402; B60W 2552/53; B60W 2050/0042; B60W 2554/805; B60W 30/18145; B60W 30/12
See application file for complete search history.

(56) References Cited

U.S. PATENT DOCUMENTS

2015/0246687 A1\* 9/2015 Takeda ................. B62D 15/025
                                                    701/41
2018/0170380 A1    6/2018 Fendt

FOREIGN PATENT DOCUMENTS

| CN | 107735309 A | \* | 2/2018 | ............... B62D 6/00 |
| JP | 2002193055 A | \* | 7/2002 | |
| JP | 2006178675 A | \* | 7/2006 | |

(Continued)

OTHER PUBLICATIONS

English_Translation_JP2011204125A (Year: 2011).\*

(Continued)

*Primary Examiner* — Peter D Nolan
*Assistant Examiner* — Ashley L Redhead, Jr.
(74) *Attorney, Agent, or Firm* — Thomas | Horstemeyer, LLP (57) ABSTRACT

A vehicle control apparatus that controls a vehicle, comprising a controller configured to execute lane departure suppression control to suppress the vehicle from departing from a division line, wherein in a case in which the shape of a road is a curve, the controller delays an operation timing of the lane departure suppression control compared to a case in which the shape of the road is not the curve, and in a case in which the shape of the road is the curve and an oncoming vehicle is detected, the controller decreases an amount of delay of the operation timing of the lane departure suppression control compared to a case in which the shape of the road is the curve and the oncoming vehicle is not detected.

7 Claims, 7 Drawing Sheets

(56) References Cited

FOREIGN PATENT DOCUMENTS

| | | | | |
|---|---|---|---|---|
| JP | 2010030386 | A | * | 2/2010 |
| JP | 4476781 | B2 | | 6/2010 |
| JP | 2011-051570 | A | | 3/2011 |
| JP | 2011204125 | A | * | 10/2011 |
| JP | 2018-527233 | A | | 9/2018 |

OTHER PUBLICATIONS

English_Translation_JP5266933B2 (Year: 2010).*
English_Translation_JP2002193055A (Year: 2002).*
English_Translation_CN107735309A (Year: 2015).*
English_Translation_JP2006178675A (Year: 2006).*
English_Translation_JP2010030386A (Year: 2010).*
Japanese Office Action for Japanese Patent Application No. 2020-092512 dated Nov. 15, 2021 (partially translated).

* cited by examiner

TIMING FOR OPERATION FOR LANE DEPARTURE SUPPRESSION
CONTROL CORRESPONDING TO ROAD CURVATURE

FIG. 5

TOLERANCE OF CORNER CUTTING CORRESPONDING TO ROAD CURVATURE

VEHICLE CONTROL APPARATUS, VEHICLE, OPERATION METHOD OF VEHICLE CONTROL APPARATUS, AND NON-TRANSITORY COMPUTER-READABLE STORAGE MEDIUM

CROSS-REFERENCE TO RELATED APPLICATION(S)

This application claims priority to and the benefit of Japanese Patent Application No. 2019-106478 filed on Jun. 6, 2019, and Japanese Patent Application No. 2020-092512 filed on May 27, 2020, the entire disclosure of which are incorporated herein by reference.

BACKGROUND OF THE INVENTION

Field of the Invention

The present invention relates to a vehicle control apparatus, a vehicle, an operation method of the vehicle control apparatus, and a non-transitory computer-readable storage medium.

Description of the Related Art

Conventionally, there is known a lane departure prevention technique as an example of a support for an occupant of a vehicle. Japanese Patent No. 4476781 discloses that the operation of lane departure suppression control is performed earlier in a vehicle when an oncoming vehicle is getting relatively close to the self-vehicle.

However, the technique disclosed in Japanese Patent No. 4476781 is problematic in that vehicle control corresponding to the presence/absence of an oncoming vehicle when a self-vehicle is traveling on a curve is not considered.

The present invention provides a technique for implementing suitable vehicle control corresponding to the presence/absence of an oncoming vehicle when a self-vehicle is traveling on a curve.

SUMMARY OF THE INVENTION

According to one aspect of the present invention, there is provided a vehicle control apparatus that controls a vehicle, comprising: a detector configured to detect a division line of a road; a shape detector configured to detect a shape of the road; a vehicle detector configured to detect an oncoming vehicle; and a controller configured to execute lane departure suppression control to suppress the vehicle from departing from the division line, wherein in a case in which the shape of the road is a curve, the controller delays an operation timing of the lane departure suppression control compared to a case in which the shape of the road is not the curve, and in a case in which the shape of the road is the curve and the oncoming vehicle is detected, the controller decreases an amount of delay of the operation timing of the lane departure suppression control compared to a case in which the shape of the road is the curve and the oncoming vehicle is not detected.

BRIEF DESCRIPTION OF THE DRAWINGS

The accompanying drawings, which are incorporated in and constitute a part of the specification, illustrate embodiments of the invention and, together with the description, serve to explain the invention.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1:
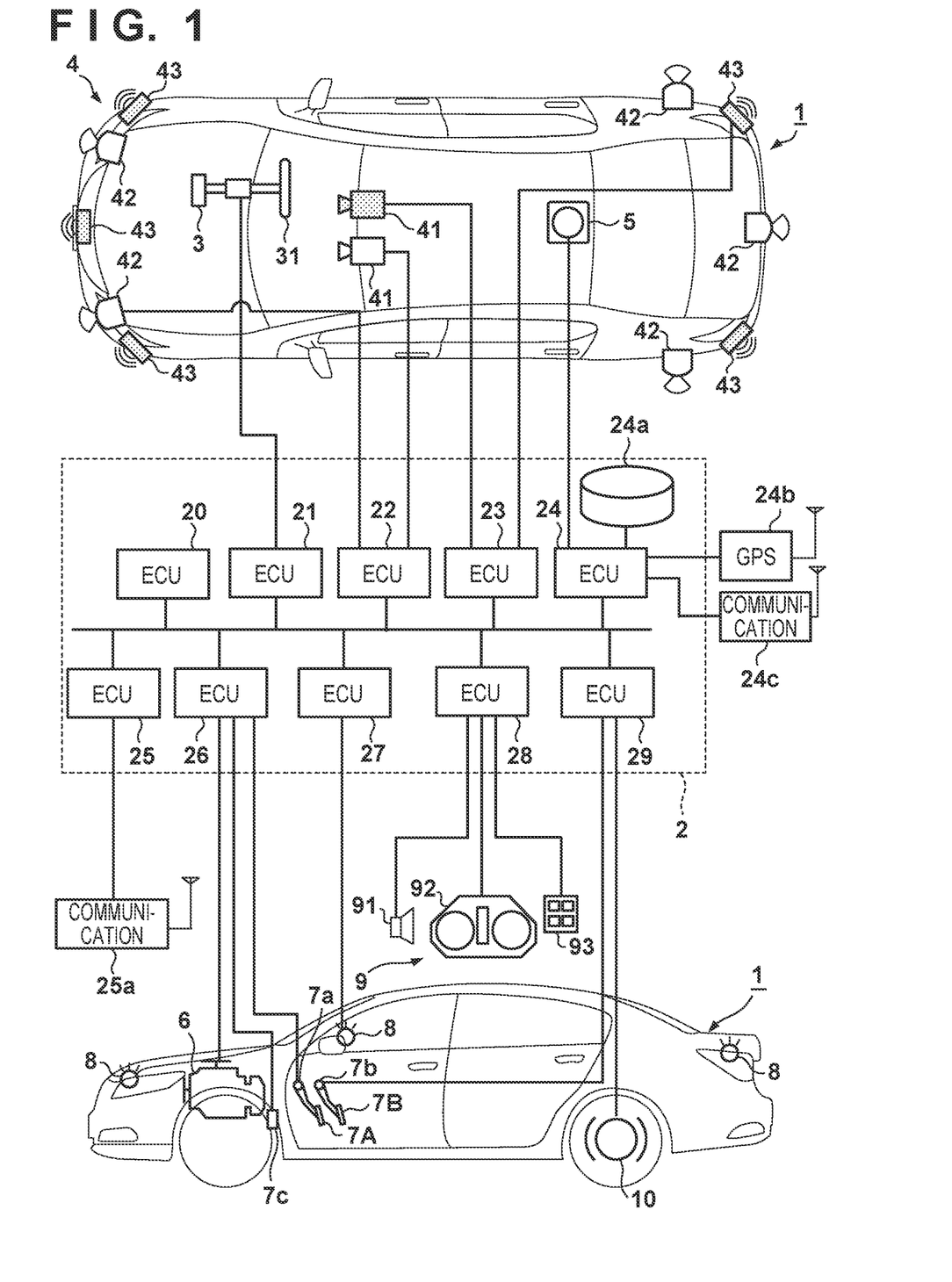
FIG. 1 is a block diagram of a vehicle control apparatus according to an embodiment.

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle.

A procedure of processing performed by an ECU 20 according to this embodiment shown in FIG. 1 will be described. The vehicle control apparatus includes a control unit (controller) 2. The control unit 2 includes a plurality of ECUs 20 to 29 communicably connected by an in-vehicle network. Each ECU includes a processor represented by a CPU (Central Processing Unit), a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed in the vehicle 1, and they can be subdivided or integrated as compared to this embodiment.

The ECU 20 executes control associated with automated driving of the vehicle 1. In automated driving, at least one of steering and acceleration/deceleration of the vehicle 1 is automatically controlled. The ECU 20 can also execute control related to driving support of the vehicle 1. Driving support includes, for example, adaptive cruise control (ACC) for reducing the driving load of a driver by executing travel by following a preceding vehicle by maintaining an appropriate following distance, and lane departure suppression control for suppress departure from a lane (division line). Automatic control of acceleration/deceleration is mainly performed in adaptive cruise control (ACC), and automatic control of the steering operation is mainly performed in lane departure suppression control.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving or driving support, the ECU 21 automatically controls the electric power steering device 3 in correspondence with an instruction from the ECU 20 and controls the direction of travel of the vehicle 1.

The ECUs 22 and 23 perform control of detection units (detector) 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the roof front of the vehicle 1. When images captured by the cameras 41 are analyzed, the contour of a target or a division line (a white line or the like) of a lane on a road can be extracted.

The detection unit 42 is Light Detection and Ranging (LIDAR) (to be sometimes referred to as the LIDAR 42 hereinafter), and detects a target around the vehicle 1 or measures the distance to a target. In this embodiment, five LIDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LIDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LIDARs, and radars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving or driving support, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

<Control Examples>

Control of the vehicle 1 executed by the ECU 20 will be described next. The ECU 20 obtains, from the ECUs 22 and 23, information related to the peripheral state (for example, the division lines of the road, the road boundaries, oncoming vehicles, targets, and the like) of the vehicle 1, and issues instructions to the ECUs 21, 26, and 29 based on the obtained information to control the steering and deceleration/acceleration of the vehicle 1. For example, the ECU 20 executes lane departure suppression control to suppress the vehicle 1 from departing from a division line or a road boundary.

Figure 2A:
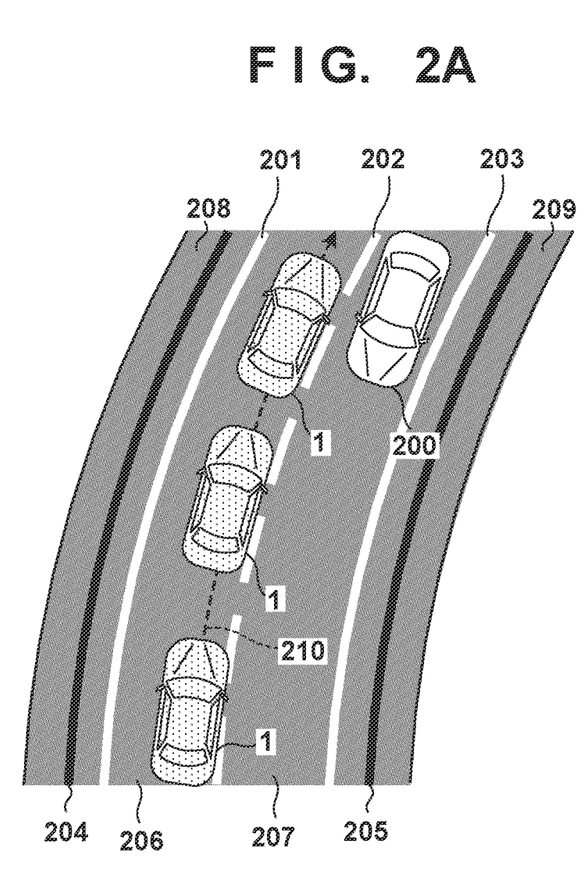
FIGS. 2A and 2B are explanatory views of lane departure suppression control of the vehicle according to the embodiment.
Figure 2B:
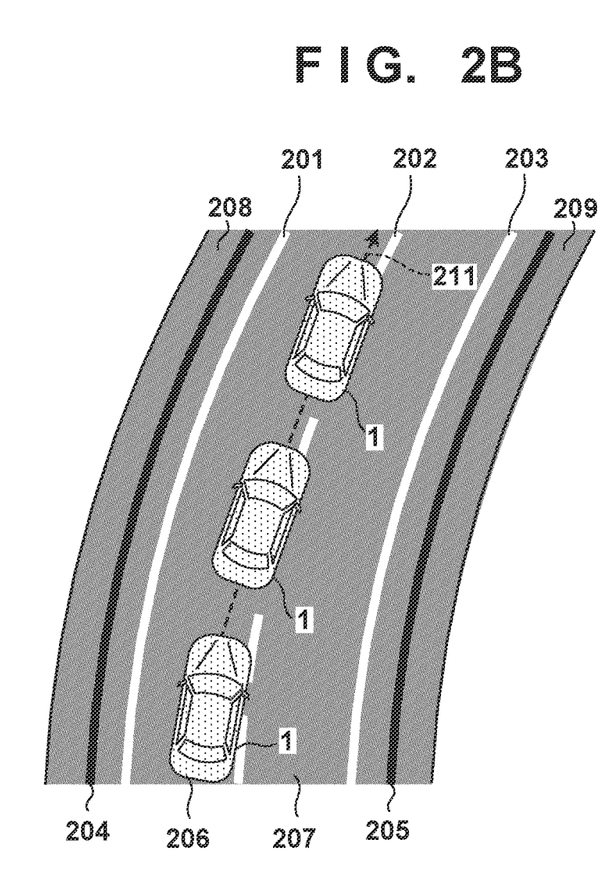

FIGS. 2A and 2B are explanatory views of lane departure suppression control of the vehicle 1 according to the embodiment. FIG. 2A is a view illustrating an example of lane departure suppression control for suppressing the departure of the self-vehicle from the center line to an oncoming lane in a case in which the shape of a road is a curve and an oncoming vehicle has been detected. FIG. 2B is a view illustrating an example of lane departure suppression control for suppressing the departure of the self-vehicle from the center line to the oncoming lane in a case in which the shape of a road is a curve and the oncoming vehicle is not detected.

Reference numeral 200 denotes an oncoming vehicle. Reference numeral 201 denotes a first division line; 202, a second division line (center line); and 203, a third division line. Reference numerals 204 and 205 denote road boundaries. The road boundaries 204 and 205 may be formed by three-dimensional objects (for example, guardrails or curbstones) present above a position higher than a road. Alternatively, the road boundaries may not always be three-dimensional objects, but may be boundaries at the same height as that of the road. Reference numeral 206 denotes a travel lane of the vehicle 1 defined by the first division line 201 and the second division line 202. Reference numeral 207 denotes a travel lane (oncoming lane) of the oncoming vehicle 200 defined by the second division line 202 and the third division line 203. Reference numerals 208 and 209 each denote a sidewalk.

In the example of FIG. 2B, departure from (that is, corner cutting with respect to) the division line (center line) is permitted by delaying the operation timing of the lane departure suppression control with respect to the division line (center line) when the self-vehicle is traveling on a curved road. Hence, the vehicle 1 travels along a track as indicated by an arrow 211.

On the other hand, in the example of FIG. 2A, since the oncoming vehicle 200 is detected when the self-vehicle is traveling on a curved road, the amount of delay of the operation timing of the lane departure suppression control with respect to the division line (center line) is decreased (including a state in which the amount of delay is set to approximately zero) compared to the example of FIG. 2B in which the oncoming vehicle 200 is not detected. As a result, lane departure suppression control will operate earlier than in the example of FIG. 2B, and the permitted amount of departure (for example, corner cutting) from the division line (center line) will decrease. Hence, the vehicle 1 will travel along a track as indicated by an arrow 210.

Figure 3:
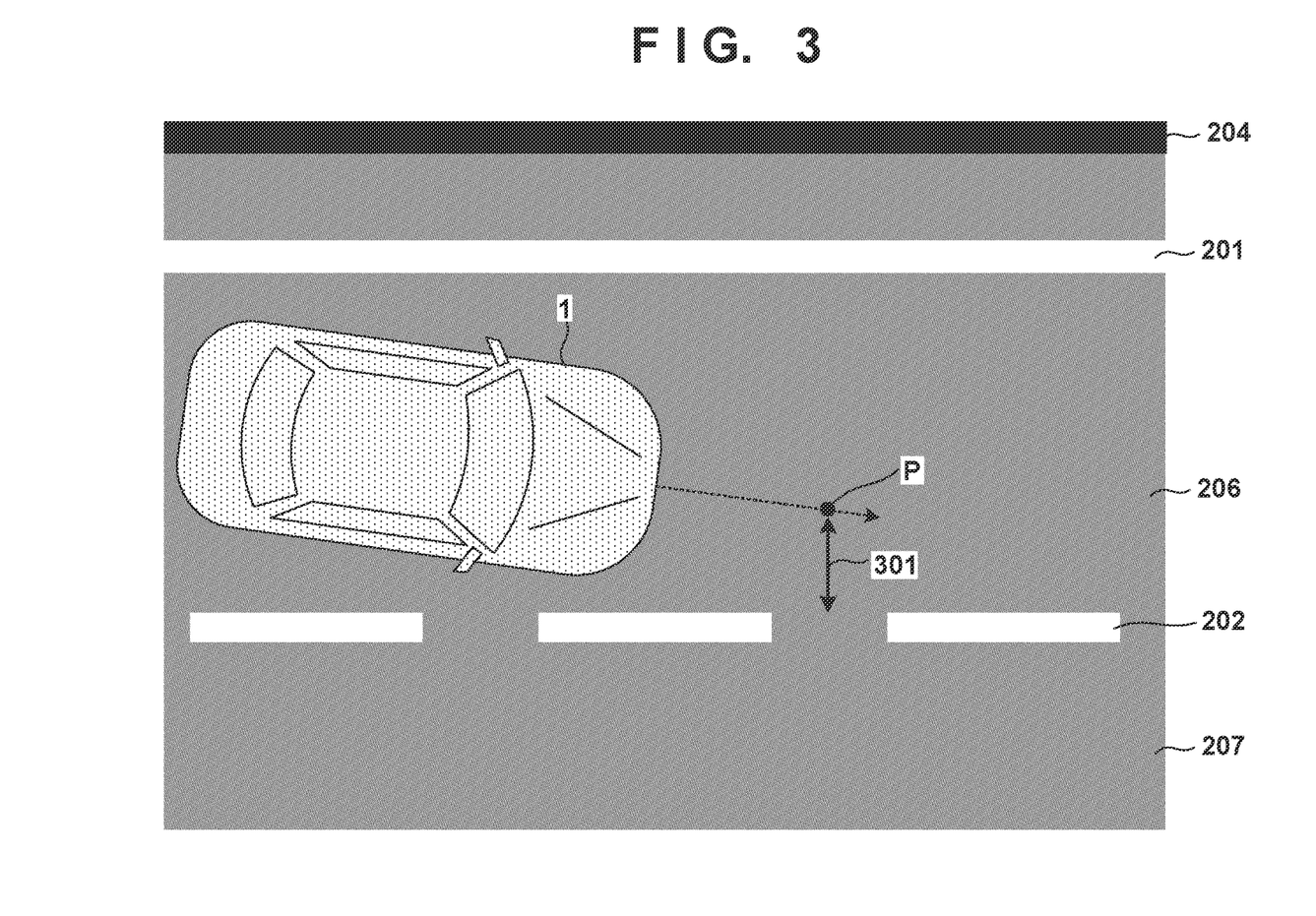
FIG. 3 is an enlarged view of the periphery of the vehicle and the division lines according to the embodiment.

FIG. 3 is an enlarged view of the periphery of the vehicle 1 and the second division line 202 (center line) according to this embodiment. In FIG. 3, reference numeral 301 denotes a distance to a determination position P for the lane departure suppression control with respect to the second division line 202. The determination position P is a reference position for determining a lateral distance which is a distance in the road width direction with respect to the second division line 202, and is a fixed position which is a predetermined distance away from the vehicle 1 in the direction of travel of the vehicle 1. However, the determination position P need not always be set at a position away from the vehicle 1, and may be set at the position of the vehicle 1 itself.

The lane departure suppression control with respect to the second division line 202 is executed based on the distance 301 from the second division line 202 to the determination position P of the vehicle 1. For example, the lane departure suppression control is executed in a case in which the distance 301 from the second division line 202 to the determination position P of the vehicle 1 becomes equal to or less than a threshold.

The operation timing of the lane departure suppression control can be changed by changing this threshold. For example, if the threshold is set to a small value, the lane departure suppression control will not operate unless the determination position P of the vehicle 1 gets closer to the second division line 202. That is, the operation timing of the lane departure suppression control with respect to the second division line 202 can be delayed by changing the threshold to a small value.

In contrast, if the threshold is set to a large value, the lane departure suppression control will operate even if the determination position P of the vehicle 1 has not gotten so close to the second division line 202. That is, the operation timing of the lane departure suppression control with respect to the second division line 202 can be made earlier by changing the threshold to a large value.

In this embodiment, in a case in which the shape of the road is a curve, the operation timing of the lane departure suppression control will be delayed compared to that in a case in which the shape of the road is not a curve. In this case, if the shape of the road is a curve and an oncoming vehicle is detected, the amount of delay of the operation timing of the lane departure suppression control will be made smaller than that of a case in which the shape of the road is a curve and an oncoming vehicle is not detected.

As a result, it will be possible to suppress the self-vehicle from getting close to an oncoming vehicle because the delay in the operation timing of the lane departure suppression control will be suppressed in a case in which the road has a curved shape and the oncoming vehicle is present.

<Example of Operation Timing of Lane Departure Suppression Control Corresponding to Curvature of Road>

Figure 4:
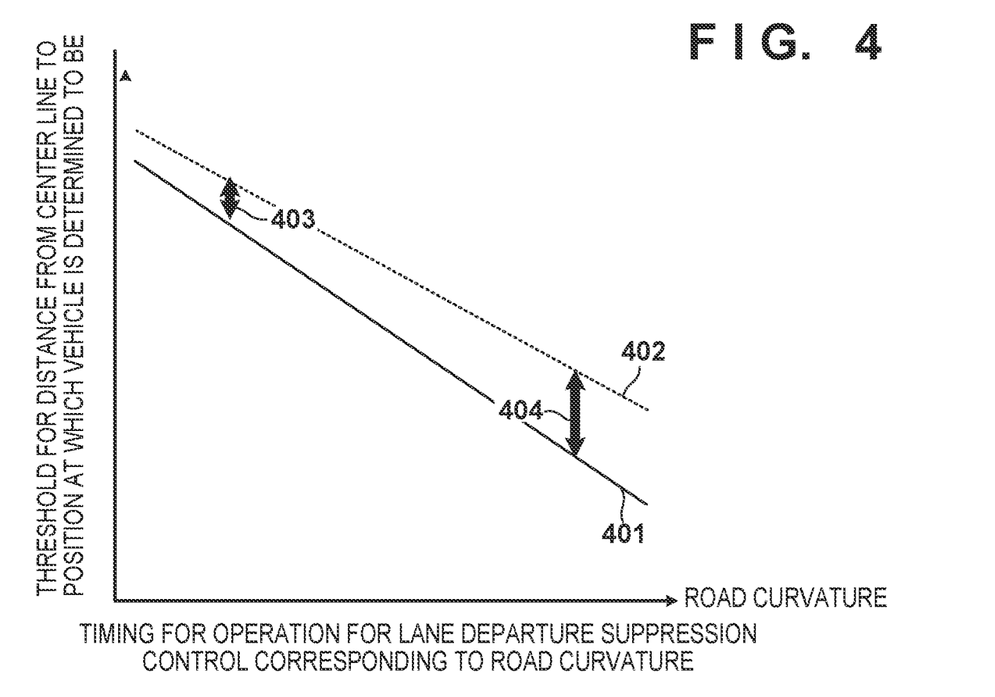
FIG. 4 is a graph showing an example of an operation timing of lane departure suppression control corresponding to the curvature of a road according to the embodiment.

In a case in which the road has a curved shape, the threshold of operating the lane departure suppression control can be changed in accordance with the curvature of the road. For example, FIG. 4 is a graph showing an example of an operation timing of the lane departure suppression control in correspondence with the curvature of the road. The abscissa indicates the curvature of the road, and the ordinate indicates the threshold of the distance from the second division line 202 (center line) to the determination position P of the vehicle 1.

A graph 401 represents an example of a case in which the shape of the road is a curve and an oncoming vehicle is not detected. A graph 402 represents an example of a case in which the shape of the road is a curve and an oncoming vehicle is detected.

In both the graph 401 and the graph 402, the lane departure suppression control will not operate unless distance from the second division line 202 (center line) to the determination position P of the vehicle 1 decreases as the curvature of the road increases. That is, the amount of delay increases as the threshold decreases, and the amount of delay decreases as the threshold increases. In this manner, in a case in which the shape of the road is a curve, the lane departure suppression control will not operate unless the self-vehicle becomes closer to the division line, regardless of the presence/absence of an oncoming vehicle, as the curvature of the road increases. As a result, the amount of delay of the operation timing of the lane departure suppression control increases. Also, in both the graph 401 and the graph 402, when the curvature of the road is small, the lane departure suppression control will operate even if the distance from the second division line 202 (center line) to the determination position P of the vehicle 1 is long. That is, in a case in which the shape of the road is a curve, the amount of delay of the operation timing of the lane departure suppression control decreases, regardless of the presence/absence of an oncoming vehicle, as the curvature of the road decreases.

Comparing the graph 401 and the graph 402, it can be seen that the distance (an arrow 403) between the two lines decreases as the curvature of the road decreases, and that the distance (an arrow 404) between the two lines increases as the curvature of the road increases. That is, the difference between the amount of delay of the operation timing of the lane departure suppression control, in a case in which the shape of the road is a curve and an oncoming vehicle is detected (the graph 402), and the amount of delay of the operation timing of the lane departure suppression control, in a case in which the shape of the road is a curve and an oncoming vehicle is not detected (the graph 401), increases as the curvature of the road increases. In this manner, when an oncoming vehicle is not detected, the difference in the amount of delay of the operation timing of the lane departure suppression control is increased, as the curvature of the road increases, compared to when an oncoming vehicle is detected.

As a result, since the operation of the lane departure suppression control will not be delayed much even if the curvature increases when an oncoming vehicle is present, the lane departure suppression control can be executed with some allowance while permitting the self-vehicle to travel freely (for example, to cut the corner), to a certain degree, on a curve.

<Example of Permitted Amount of Departure (Corner Cutting) from Division Line in Correspondence with Curvature of Road>

The relationship of the permitted amount of departure (for example, corner cutting) in correspondence with the curvature of the road will be described next with reference to FIG. 5. In a case in which control according to each graph of FIG. 4 is to be performed, departure from (for example, corner cutting with respect to) the second division line 202 will be permitted as a result of the delay in the operation timing of the lane departure suppression control.

Figure 5:
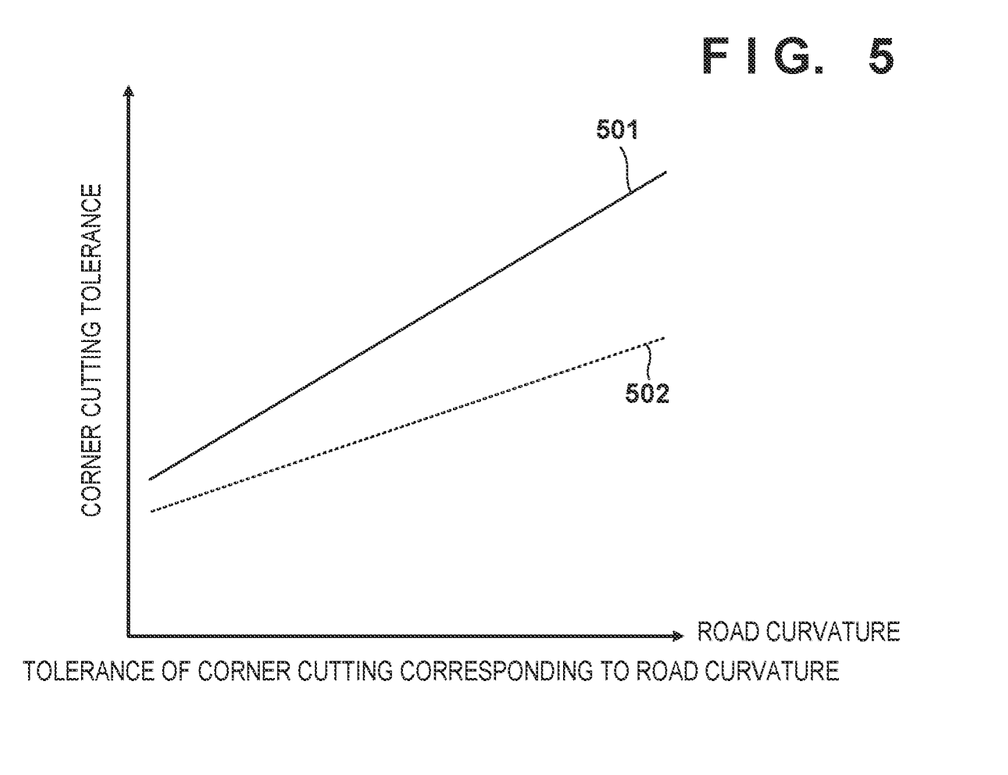
FIG. 5 is a graph showing an example of a permitted amount of corner cutting corresponding to the curvature of the road according to the embodiment.

In FIG. 5, a graph 501 represents the permitted amount of corner cutting in correspondence with the curvature of the road in a case in which control according to the graph 401 of a case in which an oncoming vehicle is not detected is performed. A graph 502 represents the permitted amount of corner cutting in correspondence with the curvature of the road in a case in which control according to the graph 402 of a case in which an oncoming vehicle is detected is performed.

Since departure from (for example, corner cutting with respect to) the second division line 202 (center line) is more permitted, as the curvature of the road increases, in a case in which an oncoming vehicle is not detected than in a case in which an oncoming vehicle is detected, the amount of tolerance will also increase. On the other hand, departure from (for example, corner cutting with respect to) the second division line 202 (center line) is less permitted in the case in which the oncoming vehicle is detected than in the case in which the oncoming vehicle is not detected.

<Processing>

The procedure of processing executed by the vehicle control apparatus according to this embodiment will be described next with reference to the flowchart of FIG. 6.

In step S601, the ECU 20 detects a division line of a road based on information related to the peripheral state of the vehicle 1 obtained from the ECUs 22 and 23. In step S602, the ECU 20 detects the shape of the road based on the information related to the peripheral state of the vehicle 1 obtained from the ECUs 22 and 23 or based on the division line of the road detected in step S601.

In step S603, the ECU 20 detects an oncoming vehicle based on the information related to the peripheral state of the vehicle 1 obtained from the ECUs 22 and 23.

Figure 7:
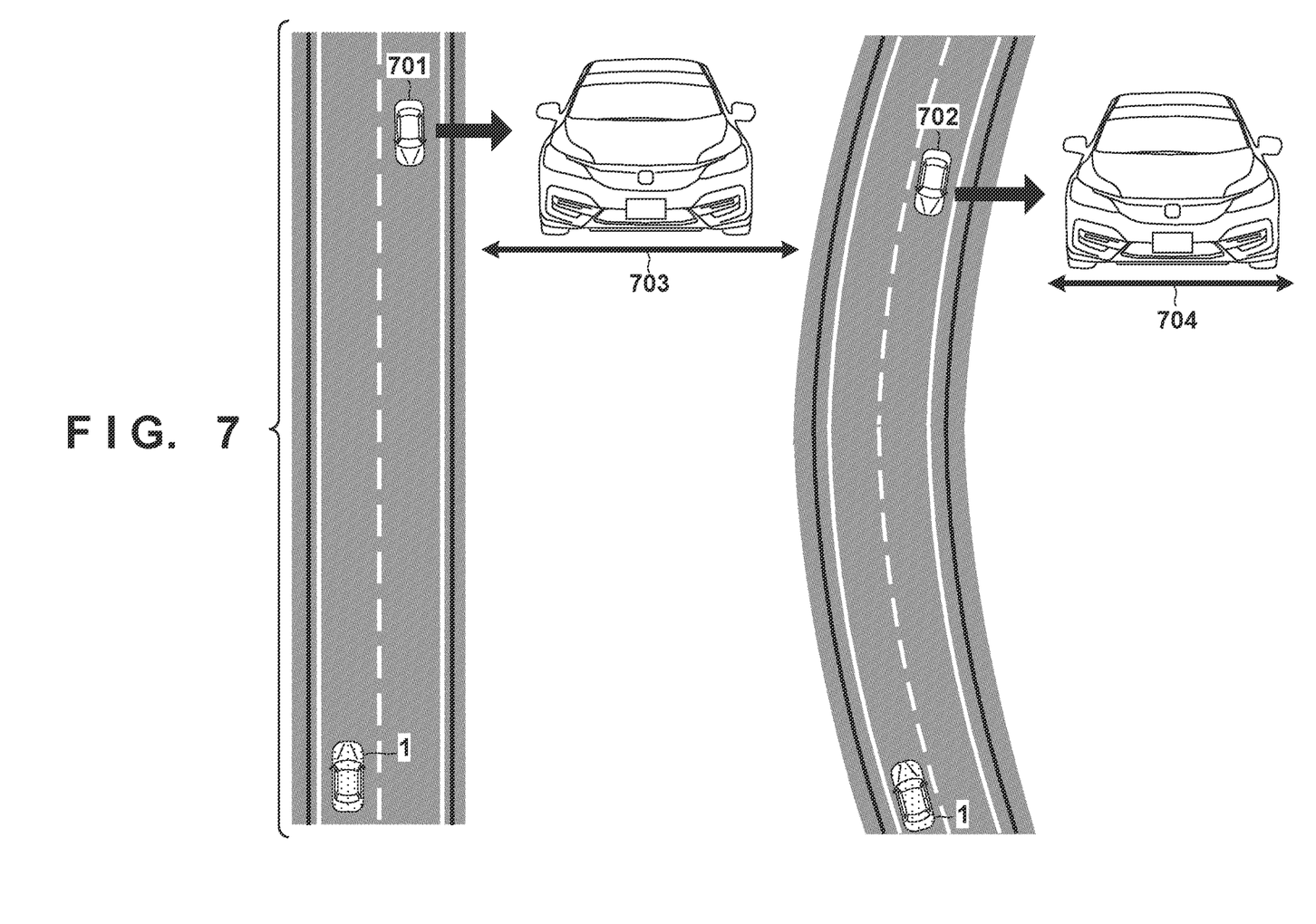
FIG. 7 is a view for explaining the difference between an oncoming vehicle determination reference used on a curved road and that used on a straight road.

An example of the detection method of an oncoming vehicle according to this embodiment will be described here with reference to FIG. 7. In FIG. 7, the vehicle 1 detects that an object is present far down the road in the direction of travel. Determination as to whether the object is an oncoming vehicle is performed in accordance with a predetermined reference. For example, in a case in which the shape of the road is a curve, the determination will be performed in accordance with a reference in which the object will be less likely determined to be an oncoming vehicle than in a case in which the shape of the road is not a curve.

For example, in a case in which an object is present within a predetermined distance range of the oncoming lane in the vehicle width direction, the detected object can be determined to be an oncoming vehicle. In this case, the degree that an object will be detected as an oncoming vehicle will be changed for a case in which the shape of the road is a curve from that of a case in which the shape of the road is not a curve. For example, an object on a straight road, such as a vehicle 701 shown in FIG. 7, will be determined to be an oncoming vehicle if the object falls within the range of a distance 703 in a relatively long vehicle width direction. An object on a curved road, such as a vehicle 702 shown in FIG. 7, will be determined to be an oncoming vehicle if the object falls within the range of a distance 704 in a relatively short vehicle width direction. As a result, in a case in which the shape of the road is a curve, an object will be less likely to be determined to be an oncoming vehicle, and thus less likely to be detected as an oncoming vehicle. Since the determination accuracy of the positional relationship between the division line and an oncoming vehicle decreases when the self-vehicle is traveling on a curved road compared to when the self-vehicle is traveling on a straight road, it is possible to reduce erroneous determination by setting so that an object will be less likely to be determined to be an oncoming vehicle.

Note that the center line of the oncoming lane can be used as the reference of the distance range in the vehicle width direction. The self-vehicle can estimate the shape of the road in the direction of travel of the vehicle 1, and estimate the position of the oncoming lane of this road. The self-vehicle can make an estimation by referring to the map information of the road that has been held in advance. Although it is possible to visually confirm a distant part of the road in the case of a straight road, it may not be possible to visually confirm the shape of the distant part of the road in the case of a curved road. Hence, the shape of the road may be estimated to estimate the center line of the oncoming lane, and determination as to whether the detected object falls within the distance range in the vehicle width direction may be performed based on the center line as a reference. Note that instead of the center line of the oncoming lane, another reference may be used as the reference of the distance range in the vehicle direction. For example, the distance range in the vehicle direction may be a range extending to the side of the oncoming lane with respect to the second division line 202 (center line) as a reference (origin). Alternatively, the distance range in the vehicle direction may be a range extending to the side of the oncoming lane with respect to the third division line 203 as a reference (origin).

In step S604, the ECU 20 determines whether the road has a curved shape. For example, if the curvature of the road is calculated and is determined to be a predetermined value or more, it can be determined that the road has a curved shape. If the road is determined to have a curved shape, the process advances to step S605. On the other hand, if the road does not have a curved shape, that is, if the road is determined to be an approximately straight road, the process advances to step S608.

In step S605, the ECU 20 determines whether an oncoming vehicle is present based on the detection result obtained in step S603. If an oncoming vehicle is present, the process advances to step S606. On the other hand, if the oncoming vehicle is not present, the process advances to step S607.

In step S606, since it has been determined that the shape of the road is a curve, the ECU 20 executes first lane departure suppression control to delay the operation timing of the lane departure suppression control compared to a case in which the shape of the road is not a curve. In the first lane departure suppression control, the operation timing of the lane departure suppression control is delayed, for example, in accordance with the graph 402 of FIG. 4 because an oncoming vehicle has been detected. That is, compared to a case in which an oncoming vehicle is not detected, the amount of delay of the operation timing of the lane departure suppression control is decreased. Hence, the departure from (for example, corner cutting with respect to) the division line will be less permitted.

In step S607, since it has been determined that the shape of the road is a curve, the ECU 20 executes second lane departure suppression control to delay the operation timing of the lane departure suppression control compared to a case in which the shape of the road is not a curve. In the second lane departure suppression control, the operation timing of the lane departure suppression control is delayed, for example, in accordance with the graph 401 of FIG. 4 because an oncoming vehicle has not been detected. That is, compared to a case in which an oncoming vehicle is not detected, the amount of delay of the operation timing of the lane departure suppression control is increased. Hence, the departure from (for example, corner cutting with respect to) the division line will be more permitted.

In step S608, since it has been determined that the shape of the road is not a curve, the ECU 20 performs control to decrease the amount of the delay or not to delay the operation timing of the lane departure suppression control compared to a case in which the shape of the road is a curve. That is, the departure from (for example, corner cutting) the division line will hardly be permitted. The series of processes of FIG. 6 ends as described above.

As described above, in this embodiment, the operation timing of the lane departure suppression control is delayed more in a case in which the shape of the road is a curve than in a case in which the shape of the road is not a curve. The amount of delay of the operation timing of the lane departure suppression control is decreased more in a case in which the shape of the road is a curve and an oncoming vehicle is detected than in a case in which the shape of the road is a curve and an oncoming vehicle is not detected.

As a result, since the operation timing of the lane departure suppression control will be delayed when the self-vehicle is traveling on a curved road compared to when the self-vehicle is traveling on a road other than a curved road, for example, a straight road, the departure from (for example, corner cutting with respect to) the division line will be more permitted. Also, when the self-vehicle is traveling on a curved road, since the operation timing of the lane departure suppression control will be delayed in a case in which an oncoming vehicle is present compared to a case in which an oncoming vehicle is not present, the self-vehicle can be suppressed from getting too close to an oncoming vehicle. Hence, since excessive execution of the lane departure suppression control is suppressed, driving support that is more in accordance with the intention of the user can be implemented. Therefore, it is possible to implement suitable vehicle control corresponding to the presence/absence of an oncoming vehicle when the self-vehicle is traveling on a curve.

[Modification]

Figure 6:
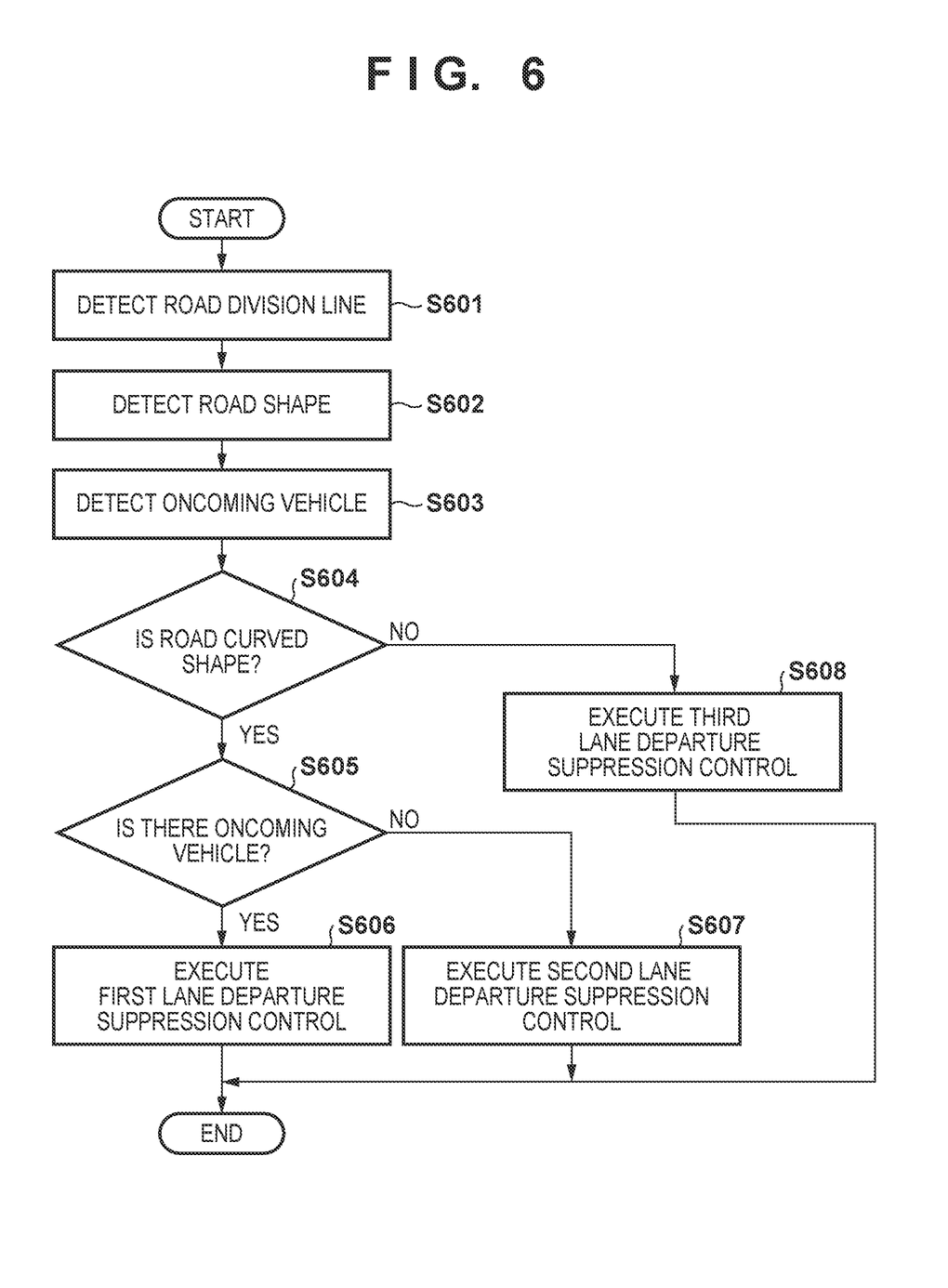
FIG. 6 is a flowchart showing the procedure of processing executed by the vehicle control apparatus according to the embodiment.

Although an example in which the degree to which an object is detected as an oncoming vehicle is changed for a case in which the road has a curved shape and for a case in which the road does not have curved shape has been described in FIG. 6, it may be set so that this degree of detection will be changed further in accordance with the distance to the object. For example, an object, such as in a vehicle 801 of FIG. 8, which is at a relatively close position from the vehicle 1 will be determined to be an oncoming vehicle (the oncoming vehicle 801) in a case in which the object falls within the range of a distance 802 in the relatively long vehicle width direction. An object, such as the vehicle 702 of FIG. 7, which is at a relatively far position from the vehicle 1 will be determined to be an oncoming vehicle (the oncoming vehicle 702) in a case in which the object falls within the range of the distance 704 in the relatively short vehicle width direction. As a result, a distant object will be less likely to be determined to be an oncoming vehicle and will be less likely to be detected as an oncoming vehicle.

Figure 8:
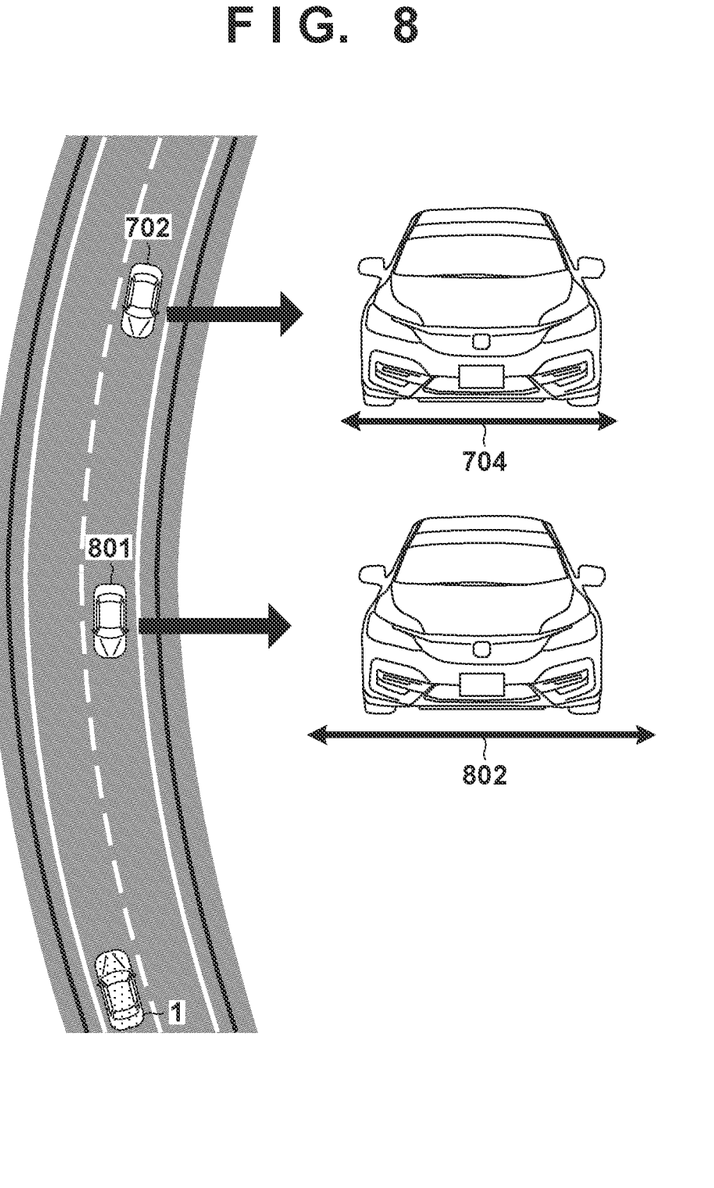
FIG. 8 is a view for explaining the difference between the oncoming vehicle determination reference used when a distance is long on the curved road and that used when a distance is short on the curved road.

In this manner, in a case in which the shape of the road is a curve, determination will be performed in accordance with a reference in which the object is less likely determined to be an oncoming vehicle as the distance to the detected object increases. According to this determination method, since the determination accuracy of the positional relationship between the division line and an oncoming vehicle will decrease with respect to a distant object, it is possible to reduce erroneous determination by decreasing the likelihood of the object to be determined to be an oncoming vehicle.

In addition, although the above embodiment has described an example in which the self-vehicle travels on the left lane, the present invention is applicable to a case in which left and right sides of the road have been reversed, that is, a case in which the self-vehicle travels on the right lane.

Also, the above embodiment has described an example in which the lane departure suppression control is executed when the lateral distance from the division line (for example, the center line) to the determination position is equal to or less than a threshold. However, the present invention is not limited to the distance. The lane departure suppression control may be executed when the time until the determination position P will depart from the division line is calculated and the calculated time becomes equal to or less than a threshold.

Furthermore, the above embodiment has described an example in which the operation timing of the lane departure suppression control is delayed by changing the threshold with respect to the lateral distance from the division line (center line) to the determination position P. However, the operation timing of the lane departure suppression control may be delayed by another method. For example, in a case in which the lane departure suppression control is to be executed in accordance with the distance or the time that has been traveled by the vehicle 1 after the departure, the operation timing of the lane departure suppression control may be changed by changing the threshold of the travel distance after the departure or the threshold of the time. As a result, a similar delay effect can be obtained.

According to the present invention, suitable vehicle control corresponding to the presence/absence of an oncoming vehicle when the self-vehicle is traveling on a curve can be implemented.

<Other Embodiments>

A program for implementing each function of one or more driving support apparatuses described in the embodiments is supplied to a system or apparatus via a network or storage medium, and one or more processors in the computer of the system or apparatus can read out and execute the program. This form can also implement the present invention.

<Summary of Embodiment>

1. A vehicle control apparatus according to the above-described embodiment is a vehicle control apparatus that controls a vehicle (for example, 1), comprising:

a detector (for example, 21, 22, 23, 41, 42, 43) configured to detect a division line (for example, 202) of a road;

a shape detector (for example, 21, 22, 23, 41, 42, 43) configured to detect a shape of the road;

a vehicle detector (for example, 21, 22, 23, 41, 42, 43) configured to detect an oncoming vehicle; and a controller (for example, 20) configured to execute lane departure suppression control to suppress the vehicle from departing from the division line, wherein in a case in which the shape of the road is a curve, the controller delays an operation timing of the lane departure suppression control compared to a case in which the shape of the road is not the curve, and in a case in which the shape of the road is the curve and the oncoming vehicle is detected, the controller decreases an amount of delay of the operation timing of the lane departure suppression control compared to a case in which the shape of the road is the curve and the oncoming vehicle is not detected.

According to this embodiment, suitable vehicle control corresponding to the presence/absence of an oncoming vehicle can be implemented when the self-vehicle is traveling on a curve.

2. In the vehicle control apparatus according to the above-described embodiment, in the case in which the shape of the road is the curve, the controller increases the amount of delay of the operation of the lane departure suppression control as a curvature of the road increases, and in the case in which the shape of the road is the curve and the oncoming vehicle is not detected, the controller increases (for example, 401, 402), as the curvature of the road increases, the amount of delay of the operation timing of the lane departure suppression control compared to the case in which the shape of the road is the curve and the oncoming vehicle is detected.

According to this embodiment, since the operation of the lane departure suppression control will not be delayed much even if the curvature increases when an oncoming vehicle is present, the lane departure suppression control can be executed with some allowance while permitting the self-vehicle to travel freely (for example, to cut the corner), to a certain degree, on a curve.

3. In the vehicle control apparatus according to the above-described embodiment, the controller increases (for example, 403, 404), as the curvature of the road increases, a difference between the amount of delay of the operation timing of the lane departure suppression control in the case in which the shape of the road is the curve and the oncoming vehicle is detected and the amount of delay of the operation timing of the lane departure suppression control in the case in which the shape of the road is the curve and the oncoming vehicle is not detected.

According to this embodiment, since the operation of the lane departure suppression control will not be delayed much, in a similar manner, even if the curvature increases when an oncoming vehicle is present, the lane departure suppression control can be executed with some allowance while permitting the self-vehicle to travel freely (for example, to cut the corner), to a certain degree, on a curve.

4. In the vehicle control apparatus according to the above-described embodiment, the vehicle detector determines, in accordance with a predetermined reference, whether a detected object is an oncoming vehicle, and the vehicle detection performs the determination in accordance with a reference in which the detected object is less likely to be determined as the oncoming vehicle in the case in which the shape of the road is the curve compared to the case in which the shape of the road is not the curve (for example, 703, 704).

According to this embodiment, since the determination accuracy of the positional relationship between the division line and the oncoming vehicle decreased when the self-vehicle is traveling on a curved road compared to when the self-vehicle is traveling on a straight road, erroneous determination can be reduced by making it less likely for a detected object to be determined to be an oncoming vehicle.

5. In the vehicle control apparatus according to the above-described embodiment, in a case in which the shape of the road is the curve, the vehicle detector performs determination in accordance with a reference in which the detected object will be increasingly less likely to be determined to be the oncoming vehicle as a distance to the detected object increases.

According to this embodiment, since the determination accuracy of the positional relationship between the division line and an oncoming vehicle will decrease with respect to a distant object, erroneous determination can be reduced by making it less likely for the distant object to be determined to be an oncoming vehicle.

6. A vehicle (for example, 1) according to the above-described embodiment is a vehicle comprising a vehicle control apparatus according to the above-described embodiment.

According to this embodiment, processing executed by the vehicle control apparatus can be implemented in a vehicle.

7. An operation method of a vehicle control apparatus according to the above-described embodiment is an operation method of a vehicle control apparatus that controls a vehicle (for example, 1), the method comprising:

detecting (for example, S601) a division line of a road;
detecting (for example, S602) a shape of the road;
detecting (for example, S603) an oncoming vehicle; and
executing (for example, S606, S607, S608) lane departure suppression control to suppress the vehicle from departing from the division line, wherein in a case in which the shape of the road is a curve, an operation timing of the lane departure suppression control is delayed, in the executing, compared to a case in which the shape of the road is not the curve, and in a case in which the shape of the road is the curve and the oncoming vehicle is detected, an amount of delay of the operation timing of the lane departure suppression control is decreased, in the executing, compared to a case in which the shape of the road is the curve and the oncoming vehicle is not detected.

According to this embodiment, suitable vehicle control corresponding to the presence/absence of an oncoming vehicle can be implemented when the self-vehicle is traveling on a curve.

8. A program according to the above-described embodiment is a program for causing a computer to function as a vehicle control apparatus according to the above-described embodiment.

According to this embodiment, the contents of the present invention can be implemented by a computer.

The invention is not limited to the foregoing embodiments, and various variations/changes are possible within the spirit of the invention.

What is claimed is:

1. A vehicle control apparatus that controls a vehicle, comprising:
   a detector configured to detect a division line of a road;
   a shape detector configured to detect a shape of the road;
   a vehicle detector configured to detect an oncoming vehicle; and
   a controller configured to execute lane departure suppression control to suppress the vehicle from departing from the division line,
   wherein in a case in which the shape of the road is a curve, the controller delays an operation timing of the lane departure suppression control compared to a case in which the shape of the road is not the curve, and
   in a case in which the shape of the road is the curve and the oncoming vehicle is detected, the controller decreases an amount of delay of the operation timing of the lane departure suppression control compared to a case in which the shape of the road is the curve and the oncoming vehicle is not detected,
   wherein the vehicle detector determines, in accordance with a predetermined reference, whether a detected object is an oncoming vehicle, and
   the vehicle detector performs the determination in accordance with a reference in which the detected object is less likely to be determined as the oncoming vehicle in the case in which the shape of the road is the curve compared to the case in which the shape of the road is not the curve.

2. The apparatus according to claim 1, wherein in the case in which the shape of the road is the curve, the controller increases the amount of delay of the operation of the lane departure suppression control as a curvature of the road increases, and
   in the case in which the shape of the road is the curve and the oncoming vehicle is not detected, the controller increases, as the curvature of the road increases, the amount of delay of the operation timing of the lane departure suppression control compared to the case in which the shape of the road is the curve and the oncoming vehicle is detected.

3. The apparatus according to claim 2, wherein the controller increases, as the curvature of the road increases, a difference in between the amount of delay of the operation timing of the lane departure suppression control in the case in which the shape of the road is the curve and the oncoming vehicle is detected and the amount of delay of the operation timing of the lane departure suppression control in the case in which the shape of the road is the curve and the oncoming vehicle is not detected.

4. The apparatus according to claim 1, wherein in a case in which the shape of the road is the curve, the vehicle detector performs determination in accordance with a reference in which the detected object will be increasingly less likely to be determined to be the oncoming vehicle as a distance to the detected object increases.

5. A vehicle comprising a vehicle control apparatus defined in claim 1.

6. An operation method of a vehicle control apparatus that controls a vehicle, the method comprising:
   detecting a division line of a road;
   detecting a shape of the road;
   detecting an oncoming vehicle; and
   executing lane departure suppression control to suppress the vehicle from departing from the division line,
   wherein in a case in which the shape of the road is a curve, an operation timing of the lane departure suppression control is delayed, in the executing, compared to a case in which the shape of the road is not the curve, and
   in a case in which the shape of the road is the curve and the oncoming vehicle is detected, an amount of delay of the operation timing of the lane departure suppression control is decreased, in the executing, compared to a case in which the shape of the road is the curve and the oncoming vehicle is not detected,
   wherein in the detecting an oncoming vehicle, in accordance with a predetermined reference, whether a detected object is an oncoming vehicle is determined, and
   the determination is performed in accordance with a reference in which the detected object is less likely to be determined as the oncoming vehicle in the case in which the shape of the road is the curve compared to the case in which the shape of the road is not the curve.

7. A non-transitory computer-readable storage medium storing a program for causing a computer to execute an operation method of a vehicle control apparatus that controls a vehicle, the method comprising:
   detecting a division line of a road;
   detecting a shape of the road;
   detecting an oncoming vehicle; and
   executing lane departure suppression control to suppress the vehicle from departing from the division line,
   wherein in a case in which the shape of the road is a curve, an operation timing of the lane departure suppression control is delayed, in the executing, compared to a case in which the shape of the road is not the curve, and
   in a case in which the shape of the road is the curve and the oncoming vehicle is detected, an amount of delay of the operation timing of the lane departure suppression control is decreased, in the executing, compared to a case in which the shape of the road is the curve and the oncoming vehicle is not detected,
   wherein in the detecting an oncoming vehicle, in accordance with a predetermined reference, whether a detected object is an oncoming vehicle is determined, and
   the determination is performed in accordance with a reference in which the detected object is less likely to be determined as the oncoming vehicle in the case in which the shape of the road is the curve compared to the case in which the shape of the road is not the curve.

* * * * *